(12) United States Patent
Chen et al.

(10) Patent No.: US 10,508,195 B2
(45) Date of Patent: *Dec. 17, 2019

(54) ENVIRONMENT-FRIENDLY MATERIAL, MANUFACTURING METHOD OF WINDOW COVERING SLAT, AND WINDOW COVERING SLAT

(71) Applicant: Chin-Fu Chen, Taichung (TW)

(72) Inventors: Hung-Hao Chen, Taichung (TW); Jong-Wu Chen, Taichung (TW); Ming-Che Tsai, Taichung (TW)

(73) Assignee: Chin-Fu Chen, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,927

(22) Filed: Apr. 4, 2018

(65) Prior Publication Data
US 2018/0291191 A1   Oct. 11, 2018

(30) Foreign Application Priority Data

Apr. 7, 2017 (TW) .............................. 106111812 A
Mar. 15, 2018 (TW) .............................. 107108850 A

(51) Int. Cl.
*C08L 23/06* (2006.01)
*C08L 23/12* (2006.01)
(Continued)

(52) U.S. Cl.
CPC .............. *C08L 23/06* (2013.01); *B29B 9/00* (2013.01); *B29B 9/10* (2013.01); *C08J 5/18* (2013.01);
(Continued)

(58) Field of Classification Search
CPC .. C08L 23/06; C08L 23/12; C08L 23/04–147; C08K 3/26; C08K 2003/265;
(Continued)

(56) References Cited

U.S. PATENT DOCUMENTS

| 4,847,317 A * | 7/1989 | Dokurno ................ C08K 3/22 524/424 |
| 6,374,560 B1 * | 4/2002 | Schiedegger ............ E06B 7/08 256/19 |

(Continued)

FOREIGN PATENT DOCUMENTS

EP 0207734 A2 * 1/1987 ............... C08K 3/22

OTHER PUBLICATIONS

Scifinder properties of CAS 13983-17-0 (Year: 2018).*

*Primary Examiner* — Kregg T Brooks
(74) *Attorney, Agent, or Firm* — Alan D. Kamrath; Karin L. Williams; Mayer & Williams PC

(57) ABSTRACT

An environment-friendly material includes 50 wt % to 70 wt % of inorganic mineral powder, 20 wt % to 45 wt % of polyolefin, and 5 wt % to 15 wt % of auxiliary agent. The inorganic mineral powder contains calcium carbonate; the polyolefin may be linear low density polyethylene, low density polyethylene, medium density polyethylene, high density polyethylene, or polypropylene; and the auxiliary agent may be polyolefin elastomer, maleic anhydride grafted polyolefin elastomer, or maleic anhydride grafted polyethylene. The disclosure also provides a manufacturing method of window covering slat using the environment-friendly material and a window covering slat manufactured by the method.

6 Claims, 1 Drawing Sheet

(51) Int. Cl.
  *C08J 5/18*   (2006.01)
  *E06B 9/386*  (2006.01)
  *C08L 23/08*  (2006.01)
  *C08L 101/00* (2006.01)
  *C08K 3/26*   (2006.01)
  *C08K 3/34*   (2006.01)
  *E06B 9/26*   (2006.01)
  *B29B 9/00*   (2006.01)
  *B29B 9/10*   (2006.01)
  *C08L 23/02*  (2006.01)
  *C08L 23/26*  (2006.01)

(52) U.S. Cl.
  CPC .................. *C08K 3/26* (2013.01); *C08K 3/34* (2013.01); *C08L 23/08* (2013.01); *C08L 23/0815* (2013.01); *C08L 23/12* (2013.01); *C08L 101/00* (2013.01); *E06B 9/26* (2013.01); *E06B 9/386* (2013.01); *C08J 2323/06* (2013.01); *C08J 2323/12* (2013.01); *C08J 2451/06* (2013.01); *C08J 2451/08* (2013.01); *C08K 2003/265* (2013.01); *C08L 2203/16* (2013.01); *C08L 2207/062* (2013.01); *C08L 2207/066* (2013.01)

(58) Field of Classification Search
  CPC .. E06B 9/386; E06B 9/388; B29B 9/10; C08J 2323/04–14
  See application file for complete search history.

(56) References Cited

U.S. PATENT DOCUMENTS

| | | | |
|---|---|---|---|
| 2007/0006981 A1* | 1/2007 | Lin | E06B 9/386 |
| | | | 160/166.1 |
| 2009/0005487 A1* | 1/2009 | Nakagawa | C08L 23/10 |
| | | | 524/427 |

* cited by examiner

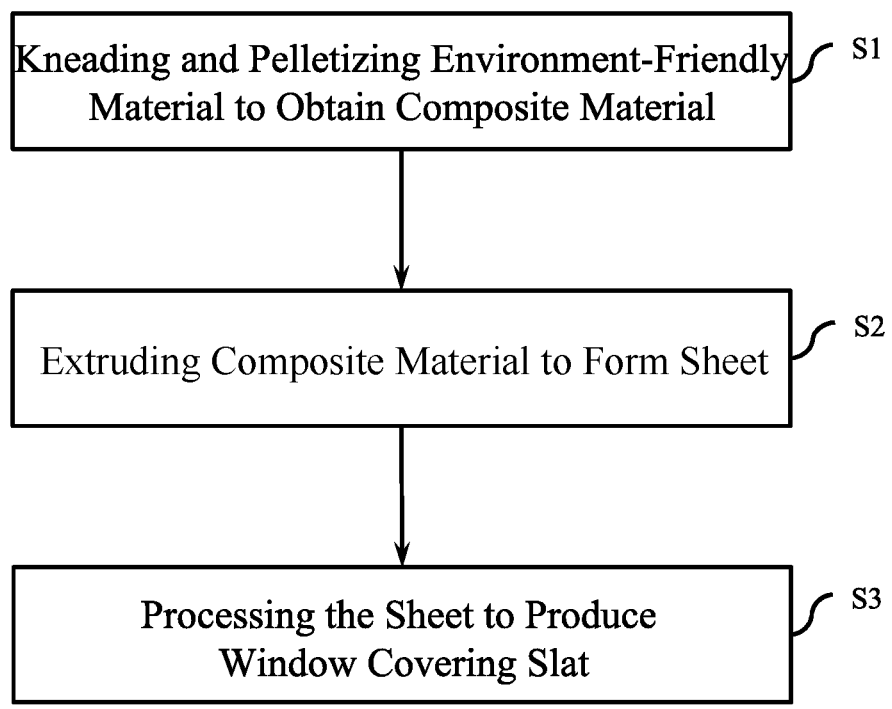

ENVIRONMENT-FRIENDLY MATERIAL, MANUFACTURING METHOD OF WINDOW COVERING SLAT, AND WINDOW COVERING SLAT

BACKGROUND OF DISCLOSURE

1. Field of the Disclosure

The present disclosure relates generally to an environment-friendly material and more particularly, to an environment-friendly material suitable for manufacturing window covering slat. Further, the present disclosure relates to a manufacturing method of window covering slat using the material, and a window covering slat manufactured by the method.

2. Description of the Related Art

Conventionally, plastic window covering slats, such as vertical or horizontal slats, are usually made of polyvinylchloride (PVC). If the old window covering slats are discarded without recycling properly, the slats will be treated as regular trash so that Dioxin will be produced in incineration, thereby causing harm to human health and environment.

Taiwan Patent No. 379272 reveals a manufacturing method of environment-friendly paper made from a raw material, which is relatively friendly to the environment, containing inorganic mineral powder, polyethylene, and auxiliary agent. However, because the product obtained therefrom has considerably low toughness, it is not suitable for making window covering slats.

In addition, because a conventional elastic sheet manufactured by using a raw material comprising inorganic mineral powder that cannot be kneaded directly, the inorganic mineral powder has to be made into masterbatch before processing such as kneading and pelletizing, extruding, etc., thereby causing higher manufacturing cost and complicated process.

SUMMARY OF THE DISCLOSURE

The present disclosure is accomplished in view of the above-noted circumstances. An objective of the present disclosure is to provide an environment-friendly material, which is suitable for manufacturing window covering slat. As such, the manufacturing cost can be reduced and the window covering slat manufactured therefrom is more environment-friendly in comparison with prior elastic window covering slat.

To attain the above objective, the present disclosure provides an environment-friendly material comprising 50 wt % to 70 wt % of inorganic mineral powder, 20 wt % to 45 wt % of polyolefin, and 5 wt % to 15 wt % of auxiliary agent. The inorganic mineral powder includes calcium carbonate ($CaCO_3$); the polyolefin may be linear low density polyethylene (LLDPE), low density polyethylene (LDPE), medium density polyethylene (MDPE), high density polyethylene (HDPE), or polypropylene (PP); and the auxiliary agent may be polyolefin elastomer (POE), maleic anhydride grafted polyolefin elastomer (POE-g-MA), or maleic anhydride grafted polyethylene (PE-g-MA).

According to the environment-friendly material of the present disclosure, the inorganic mineral powder is calcium carbonate. Or, the inorganic mineral powder includes calcium carbonate and at least one inorganic calcium salt except calcium carbonate, and the calcium carbonate is present in an amount greater than an amount of the at least one inorganic calcium salt except calcium carbonate. As such, the hardness of the product, such as window covering slat, made from the material, can be further increased.

Further, the at least one inorganic calcium salt except calcium carbonate may be calcium silicate ($CaSiO_3$), calcium sulfate ($CaSO_4$), calcium nitrate ($Ca(NO_3)_2$) or calcium phosphate ($Ca(PO_4)_2$).

It is another objective of the present disclosure to provide a manufacturing method of window covering slat, which is capable of simplifying the manufacturing process and reducing the manufacturing cost.

To attain the above objective, the present disclosure provides a manufacturing method of window covering slat, comprising the steps of:

a) kneading and pelletizing an environment-friendly material comprising 50 wt % to 70 wt % of inorganic mineral powder, 20 wt % to 45 wt % of polyolefin, and 5 wt % to 15 wt % of auxiliary agent to obtain a composite material; wherein the inorganic mineral powder comprises calcium carbonate; the polyolefin is LLDPE, LDPE, MDPE, HDPE, or PP; and the auxiliary agent is POE, POE-g-MA, or PE-g-MA;

b) extruding the composite material obtained in step a) to form a sheet; and c) processing the sheet obtained in step b) to produce a window covering slat.

According to the manufacturing method of the present disclosure, the inorganic mineral powder in step a) may be calcium carbonate. Or, the inorganic mineral powder in step a) includes calcium carbonate and at least one inorganic calcium salt except calcium carbonate, and the calcium carbonate is present in an amount greater than an amount of the at least one inorganic calcium salt except calcium carbonate. The at least one inorganic calcium salt except calcium carbonate may be calcium silicate, calcium sulfate, calcium nitrate or calcium phosphate.

According to the manufacturing method of the present disclosure, the kneading and pelletizing in step a) may be implemented by, but not limited to, a planetary mixer, a Banbury mixer, a kneader, or a twin-screw mixer.

It is a further objective of the present disclosure to provide a window covering slat which is manufactured by the present manufacturing method.

Because the present material is not only polyvinylchloride-free but also comprises quite an amount of calcium carbonate or mixture of calcium carbonate and inorganic calcium salt other than calcium carbonate, which is low cost and readily obtained, the present material is environment-friendly and the manufacturing cost can be effectively reduced. In addition, because the present manufacturing method using the environment-friendly material of the present disclosure, which can be homogeneously mixed directly without being first processed into masterbatch even though containing high ratio of the inorganic mineral powder, the manufacturing method has advantages of environment-friendly, simplified manufacturing process and reduced manufacturing cost.

BRIEF DESCRIPTION OF THE DRAWINGS

FIG. 1 is a flow chart illustrating the manufacturing method of the window covering slat of the present disclosure.

DETAILED DESCRIPTION OF THE DISCLOSURE

The present disclosure provides an environment-friendly material which can be used to manufacture environment-friendly window covering slat having appropriate mechanical strength. The window covering slat thus obtained is applicable to panel-type curtain, vertical louver or horizontal louver.

The environment-friendly material according to the present disclosure may comprise 50 wt % to 70 wt % of inorganic mineral powder, 20 wt % to 45 wt % of polyolefin, and 5 wt % to 15 wt % of auxiliary agent.

The inorganic mineral powder may be solid particles at room temperature and may be calcium carbonate ($CaCO_3$); or may include calcium carbonate and at least one inorganic calcium salt except calcium carbonate, and the calcium carbonate is present in an amount greater than an amount of the at least one inorganic calcium salt except calcium carbonate, so as to further increase the hardness of the product made from the material (such as window covering slat). Or, the inorganic mineral powder may further comprise talcum powder. The at least one inorganic calcium salt except calcium carbonate may be, but not limited to, calcium silicate ($CaSiO_3$), calcium sulfate ($CaSO_4$), calcium nitrate ($Ca(NO_3)_2$) or calcium phosphate ($Ca(PO_4)_2$), etc.

The polyolefin may be linear low density polyethylene (LLDPE), low density polyethylene (LDPE), medium density polyethylene (MDPE), high density polyethylene (HDPE), or polypropylene (PP). In consideration of improving the toughness of the manufactured window covering slat, the polyolefin may preferably be LLDPE, HDPE or PP and more preferably be LLDPE.

The auxiliary agent may be polyolefin elastomer (POE), maleic anhydride grafted polyolefin elastomer (POE-g-MA), or maleic anhydride grafted polyethylene (PE-g-MA). In order to enhance the tear resistance of the manufactured window covering slat, the polyolefin may preferably be POE-g-MA.

According to the environment-friendly material of the present disclosure, in consideration of improving the hardness of the manufactured window covering slat, the present material may preferably comprise 60 wt % to 70 wt % of inorganic mineral powder, and more preferably comprise 65 wt % of inorganic mineral powder, 30 wt % of polyolefin, and 5 wt % of auxiliary agent.

In addition to the components mentioned above, additional additives may optionally be added to the present material, without changing the physical/chemical properties of the present material, to provide corresponding functions or properties according to an actual need. For example, a bleaching agent, a toner or a pigment may be used to change the color of the manufactured window covering slat. Or, an antioxidant or an anti-ultraviolet agent may be used to prolong the lifetime of the manufactured window covering slat. Or, a UV absorber may be used to increase the ultraviolet absorption capacity of the manufactured window covering slat. In addition, a lubricant, an elastic auxiliary agent or an antistatic agent may also be used.

The present disclosure also provides a manufacturing method of window covering slat, which can be used to manufacture environment-friendly window covering slat having appropriate mechanical strength, and thus the obtained window covering slat is applicable to panel-type curtain, vertical louver or horizontal louver.

Referring to FIG. 1, the manufacturing method according to the present disclosure comprises step S1 of kneading and pelletizing an environment-friendly material to obtain a composite material. Then, in step S2, the obtained composite material is extruded to form a sheet. Finally, the obtained sheet is further processed, in step S3, to produce a window covering slat.

In step S1, the environment-friendly material mainly includes 50 wt % to 70 wt % of inorganic mineral powder, 20 wt % to 45 wt % of polyolefin, and 5 wt % to 15 wt % of auxiliary agent.

Detailed descriptions of the inorganic mineral powder, polyolefin and auxiliary agent, which are identical to those described above, are omitted for simplicity.

In step S1, in consideration of improvement in the hardness of the manufactured window covering slat, the environment-friendly material used in the present manufacturing method may preferably comprise GO wt % to 70 wt % of inorganic mineral powder, and more preferably comprise 65 wt % of inorganic mineral powder, 30 wt % of polyolefin, and 5 wt % of auxiliary agent.

Further, as described above, one or more additional additives may optionally be added to the environment-friendly material used in step S1, without changing the physical/chemical properties thereof, according to an actual requirement. The additional additive may be, but not limited to, a bleaching agent, a toner, a pigment, an antioxidant, an anti-ultraviolet agent, a UV absorber, a lubricant, an elastic auxiliary agent and an antistatic agent, and may be added in a small amount in addition to the components contained in the environment-friendly material.

In step S1, the kneading and pelletizing of the environment-friendly material may be implemented by, but not limited to, a planetary mixer, a Banbury mixer, a kneader, or a twin-screw mixer, to obtain the composite material to be used in the following step S2.

In step S2, the extrusion of the composite material to form the sheet may be accomplished by any type of applicable extruder known in the art, such as, but not limited to, a hot-press extruder.

Finally, in step S3, the sheet thus obtained in step S2 is further processed to produce a window covering slat.

Hereinafter, a preferred embodiment of the manufacturing method according to the present disclosure is utilized to produce a slat sample. The physical property, such as impact-resistance of the slat sample, is tested.

The materials of examples and comparative examples shown in the following Table 1 are respectively kneaded and pelletized by a planetary mixer under 170° C. to 210° C. to obtain composite materials. The composite materials are then extruded respectively by a hot-press extruder under 180° C. to form sheets. The sheets thus obtained are respectively cut into slat samples having dimensions of 90 mm×12 mm×1 mm. The impact-resistance test (mechanical strength) of the slat samples manufactured from the materials of examples and comparative examples are tested at room temperature and the test results are shown in the following Table 2.

TABLE 1

| Components of Materials (wt %) | | Examples 1 | 2 | 3 | 4 | 5 | 6 | 7 | 8 | 9 | 10 | Comparative Examples 1 | 2 |
|---|---|---|---|---|---|---|---|---|---|---|---|---|---|
| Inorganic Mineral Powder | CaCO$_3$ | 50 | 50 | 55 | 55 | 55 | 65 | 65 | 65 | 70 | 60 | 75 | 75 |
| | CaSiO$_3$ | — | — | — | — | — | — | — | — | — | 5 | — | — |
| Polyolefin | LLDPE | — | — | — | 35 | — | 30 | — | — | — | — | 25 | 20 |
| | HDPE | 40 | 45 | 35 | — | — | — | — | — | — | — | — | — |
| | PP | — | — | — | — | 35 | — | 30 | 30 | 25 | 30 | — | — |
| Auxiliary Agent | POE | — | — | — | — | — | — | — | 5 | — | — | — | — |
| | POE-g-MA | — | — | — | 10 | 10 | 5 | 5 | — | 5 | 5 | — | 5 |
| | PE-g-MA | 10 | 5 | 10 | — | — | — | — | — | — | — | — | — |

TABLE 2

| Impact-Resistance Test | Examples 1 | 2 | 3 | 4 | 5 | 6 | 7 | 8 | 9 | 10 | Comparative Examples 1 | 2 |
|---|---|---|---|---|---|---|---|---|---|---|---|---|
| Result (±1 lb) | 10 | 10 | 8 | 30 | 25 | 25 | 15 | 10 | 8 | 20 | 3 | 5 |
| Suitable for Window Covering Slats | Yes | Yes | Yes | Yes | Yes | Yes | Yes | Yes | Yes | Yes | No | No |

On the basis that a window covering slat applicable for vertical or horizontal louver should in general have an impact resistance of at least about 7 pounds, because each of the slat samples made of the materials of examples by the present manufacturing method has an impact resistance larger than 7 pounds, it is proven that the material and the manufacturing method of the present disclosure are suitable for manufacturing window covering slat having superior mechanical strength.

In addition, in comparison with the material including HDPE and PE-g-MA of example 3, the material including LLDPE and POE-g-MA of example 4 can be used to manufacture a window covering slat having more superior impact resistance.

Further, the amounts of polypropylene (PP) and POE-g-MA contained in example 7 and example 10 are the same. By comparing example 10 including both CaCO$_3$ and CaSiO$_3$ with example 7 including CaCO$_3$ only, the window covering slats of example 10 has enhanced impact-resistance and hardness (the hardness of example 10 is 59-60, while the hardness of example 7 is 58-59). As such, the strength of the window covering slats can also be increased. The aforesaid hardness is measured by Shore Durometer (Model D). Specifically, put a test sheet onto a firm surface first, then hold the durometer to press steadily the presser foot on the test sheet without any vibration and keep the presser foot parallel to the test sheet surface so that the indenter presses into the test sheet vertically. When the presser foot is in complete contact with the test sheet, take the reading within 1 second to obtain the hardness.

In conclusion, the material of the present disclosure is suitable for producing window covering slat having superior mechanical property. And, because the present material is polyvinylchloride-free and includes quite an amount of calcium carbonate, the present material is environment-friendly and the manufacturing cost can be effectively reduced. Further, because the manufacturing method of the present disclosure utilizing the present material, which can be homogeneously mixed directly without being first processed into masterbatch even though containing inorganic mineral powder in a greater than 50 wt %, the manufacturing method has advantages of environment-friendly, simplified manufacturing process and reduced manufacturing cost. Furthermore, the window covering slat produced from the present manufacturing method is not only environment-friendly but also has superior mechanical property.

What is claimed is:

1. An environment-friendly material comprising:
   65 wt % of inorganic mineral powder comprising calcium carbonate 60 wt % and calcium silicate 5 wt % both calcium carbonate and calcium silicate amounts being a percentage of the environment-friendly material;
   20 wt % to 30 wt % of polyolefin, selected from a group consisting of linear low density polyethylene, low density polyethylene, medium density polyethylene, high density polyethylene, and polypropylene; and
   5 wt % to 15 wt % of auxiliary agent selected from a group consisting of polyolefin elastomer, maleic anhydride grafted polyolefin elastomer, and maleic anhydride grafted polyethylene.

2. The environment-friendly material as claimed in claim 1, wherein the environment-friendly material comprises 30 wt % of polyolefin, and 5 wt % of the auxiliary agent.

3. The environment-friendly material as claimed in claim 1, wherein the polyolefin is linear low density polyethylene, high density polyethylene, or polypropylene.

4. The environment-friendly material as claimed in claim 3, wherein the polyolefin is linear low density polyethylene or polypropylene.

5. The environment-friendly material as claimed in claim 1, wherein the auxiliary agent is maleic anhydride grafted polyolefin elastomer.

6. A window covering slat comprising the environment-friendly material of claim 1.

* * * * *